United States Patent [19]

Takahashi et al.

[11] Patent Number: 5,125,347
[45] Date of Patent: Jun. 30, 1992

[54] POWER SUPPLY SYSTEM FOR A LINEAR MOTOR TYPE TRANSPORTATION SYSTEM

[75] Inventors: Youji Takahashi; Toyoharu Uchiyama; Kiyoshi Nakamura; Akira Kimura; Shigeyoshi Koike, all of Katsuta; Koumei Miyairi, Noda, all of Japan

[73] Assignee: Hitachi, Ltd., Tokyo, Japan

[21] Appl. No.: 603,329

[22] Filed: Oct. 25, 1990

[30] Foreign Application Priority Data

Oct. 30, 1989 [JP] Japan .................................. 1-279700

[51] Int. Cl.$^5$ ............................................. B60L 13/10
[52] U.S. Cl. .................... 104/298; 104/301; 246/187 B; 318/38
[58] Field of Search ............... 104/295, 298, 299, 301, 104/290, 292; 246/187 B, 187 R; 318/38, 135, 687

[56] References Cited

U.S. PATENT DOCUMENTS

| | | | |
|---|---|---|---|
| 3,803,466 | 4/1974 | Starkey ........................... | 104/298 X |
| 4,068,152 | 1/1978 | Nakamura et al. ............ | 104/298 X |
| 4,348,618 | 9/1982 | Nakamura et al. ............ | 104/298 X |
| 4,766,817 | 8/1988 | Uozumi .......................... | 104/299 |
| 4,840,125 | 6/1989 | Lueers ............................ | 104/292 |

*Primary Examiner*—Margaret A. Focarino
*Assistant Examiner*—Joseph D. Pape
*Attorney, Agent, or Firm*—Antonelli, Terry Stout & Kraus

[57] ABSTRACT

A power supply system for a linear motor type transportation system includes a series of driving coils disposed along a railroad track for producing a moving magnetic field to drive a train, a plurality of feeding blocks disposed along the railroad track for supplying electric power to the series of driving coils, a plurality of power converters each connected to the corresponding feeding blocks to supply electric power to each corresponding feeding section composed of the feeding blocks, and a plurality of block switches connected between neighboring two feeding blocks of the feeding blocks. Each of main controllers for determining each feeding section includes a boundary candidate operation unit for calculating a feeding section boundary candidate of a power converter between the neighboring power converters on the basis of the position information of a train being present in the feeding section, a section boundary determining unit, and a feeding block switch control unit for controlling on-off states of the block switches so as to define the feeding section boundary between neighboring two feeding blocks. Each boundary determining unit selects one boundary from two boundary candidates supplied from the boundary candidate operation units of the main controller of the neighboring two power converters.

18 Claims, 13 Drawing Sheets

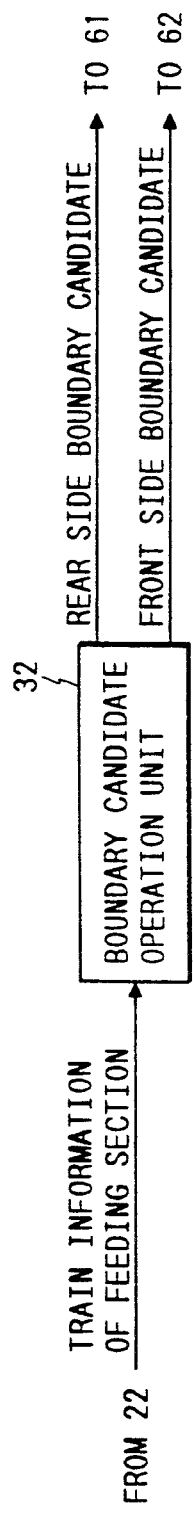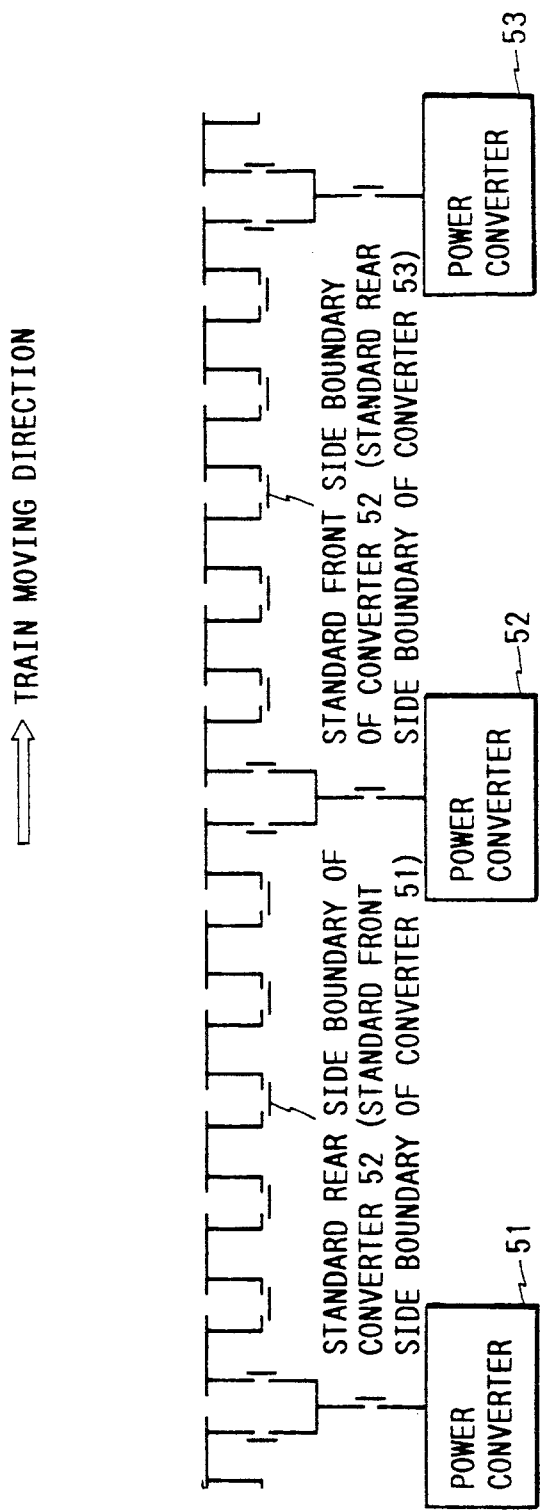

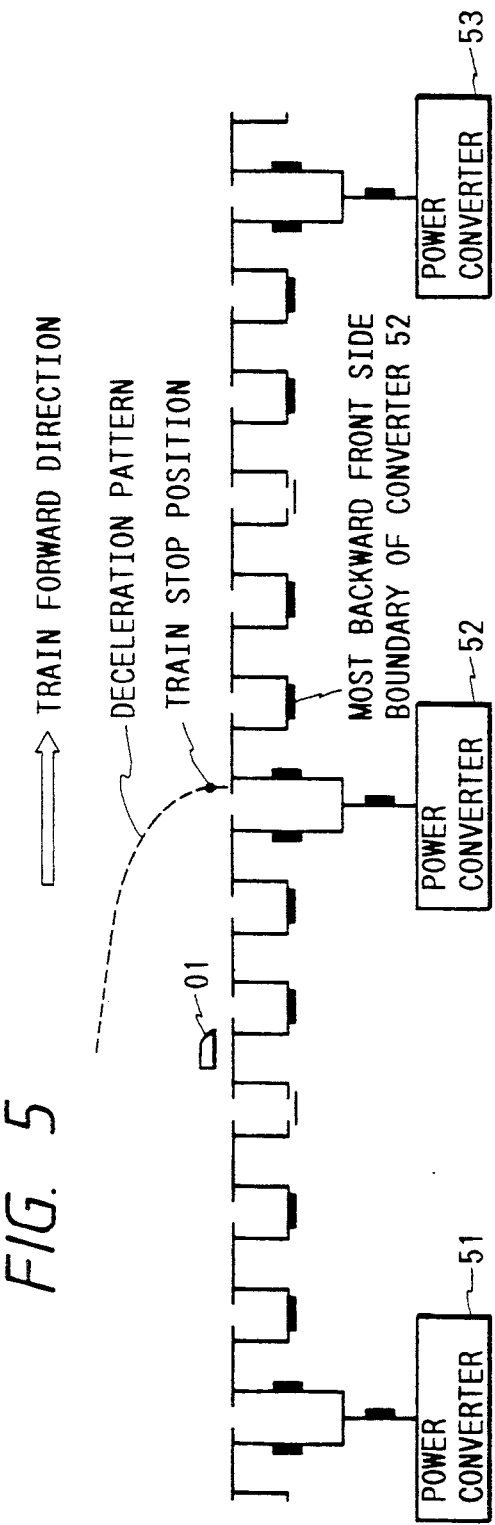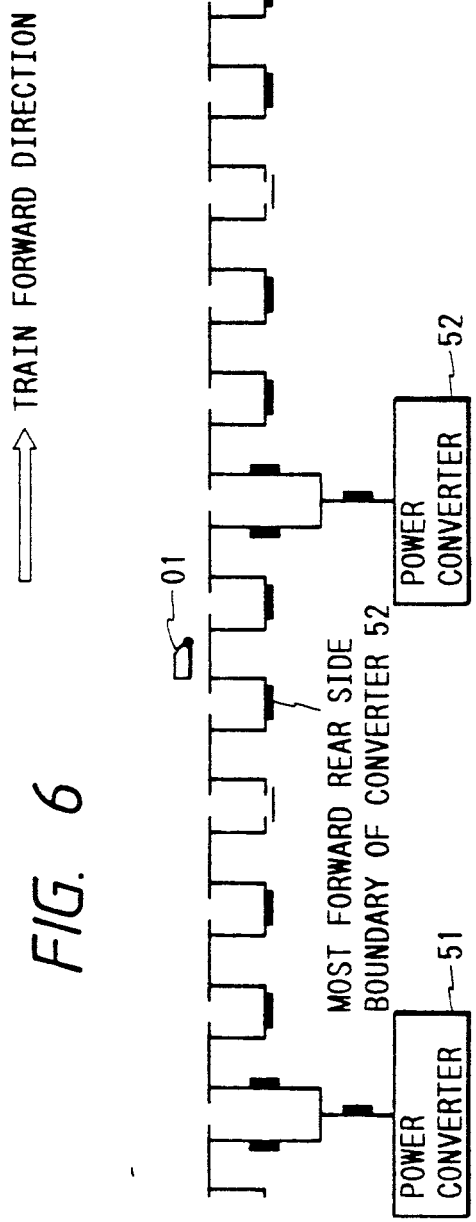

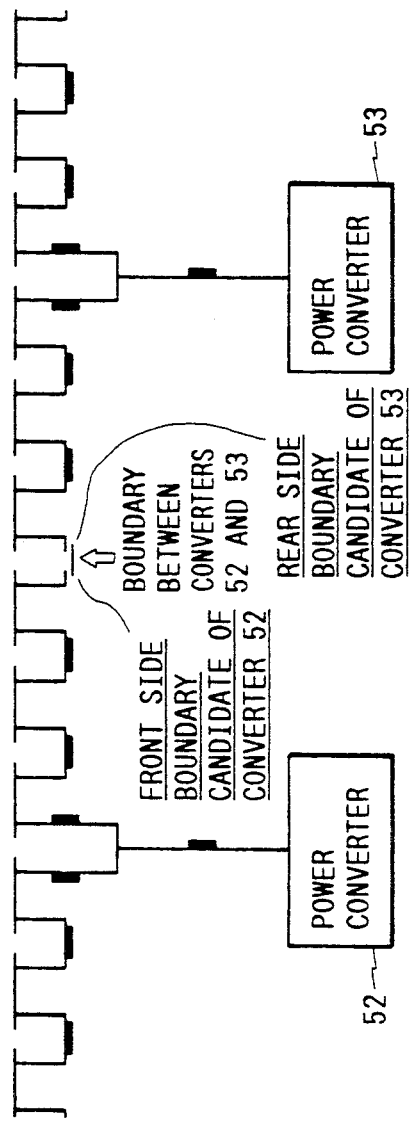
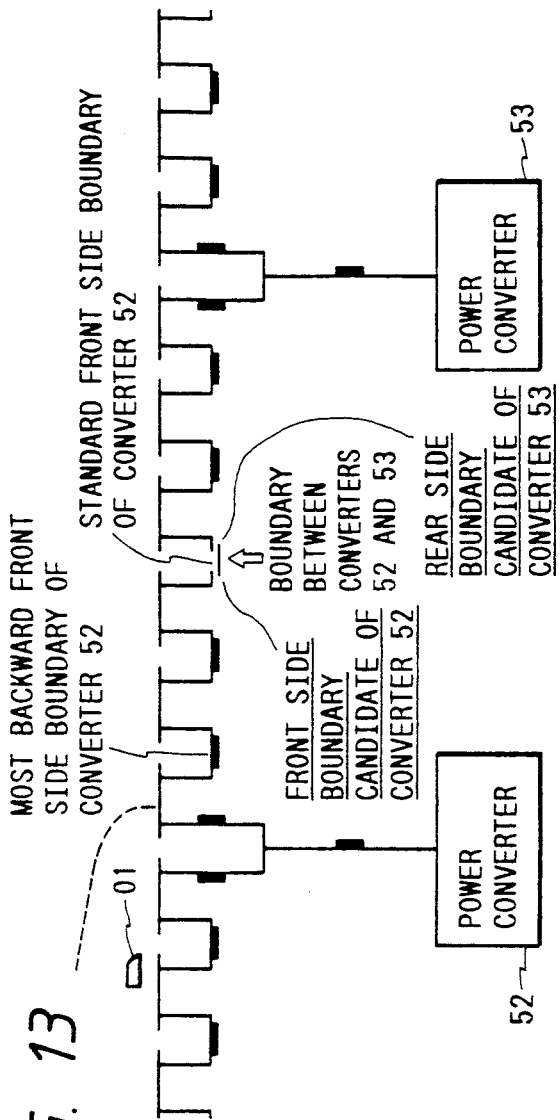

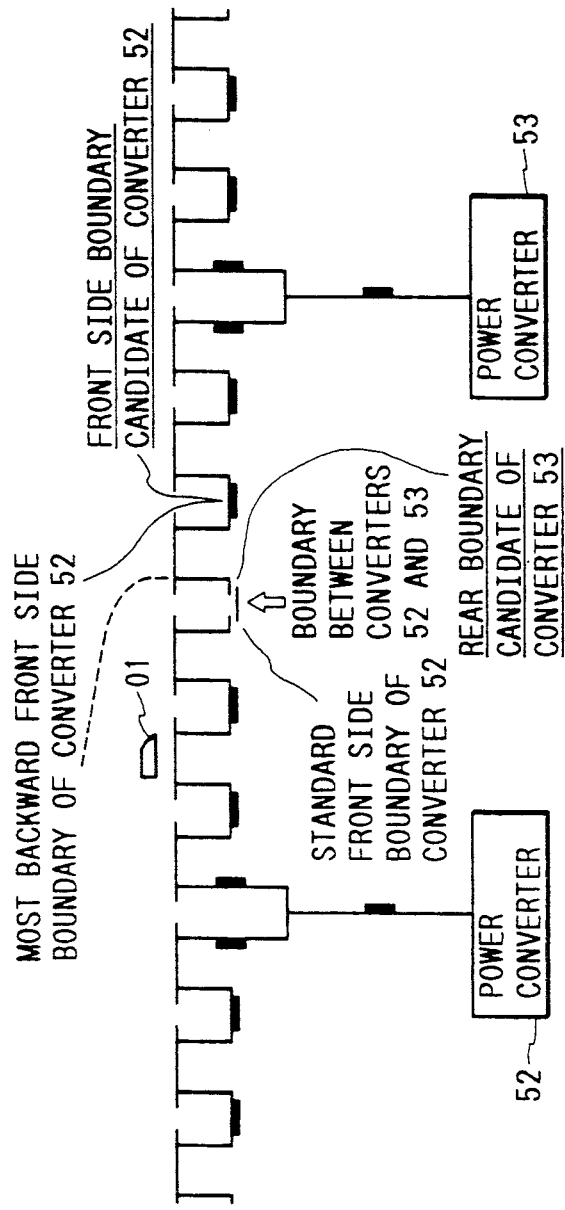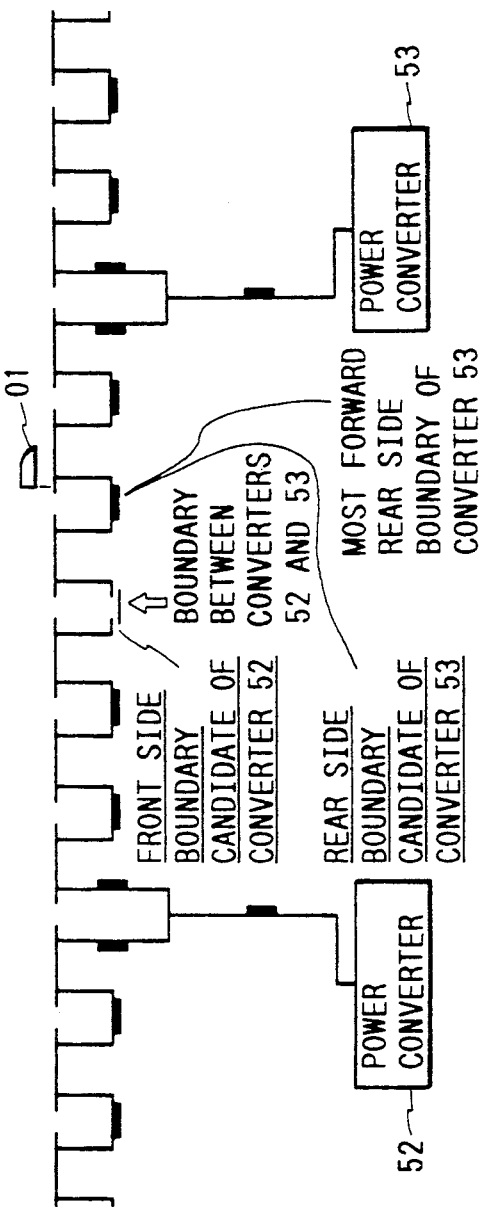
FIG. 14
FIG. 15

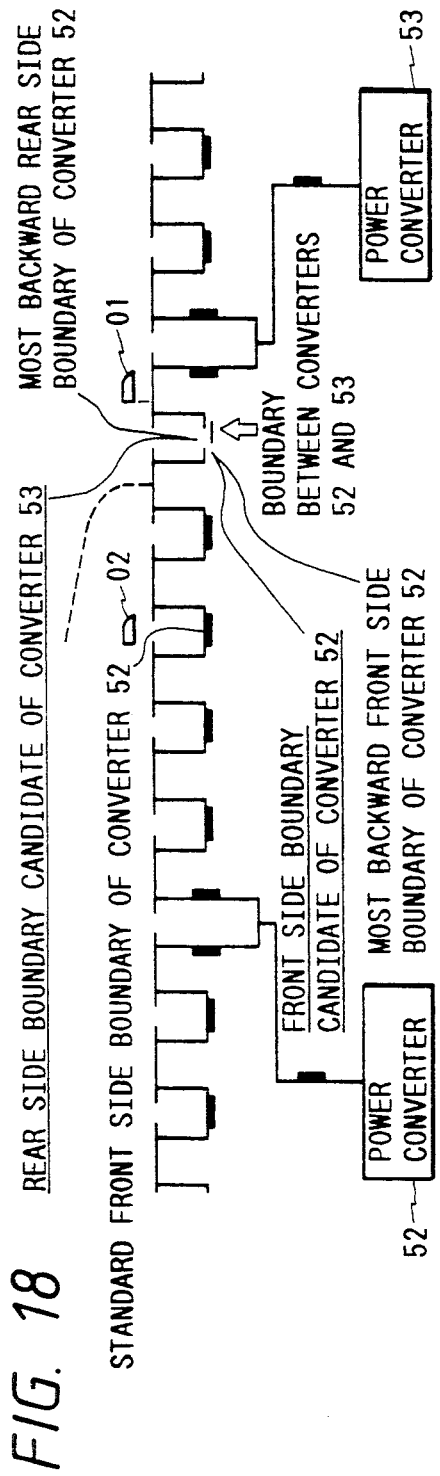

POWER SUPPLY SYSTEM FOR A LINEAR MOTOR TYPE TRANSPORTATION SYSTEM

BACKGROUND OF THE INVENTION

In a linear motor type transportation system using a ground primary linear motor, for example, a linear synchronous motor system, a linear induction motor system or a D.C. linear motor system disposed on the ground, an amplitude and a frequency of current supplied to primary driving coils of the linear motor from an electric power converter such as a cyclo-converter and inverter arranged on the ground are controlled to carry out train traction control. In this case, one power converter unit or power substation is usually allocated to one corresponding group of trains to be driven because the frequency of the supplied current to the primary driving coils has to be controlled in response to the speed of the train. Therefore, plural power converters are needed to drive a plurality of groups of the trains. The above power feeding system is described in the transaction papers of the 19th Japan symposium for introducing cybernetics techniques into railroad control. entitled "805 evaluation of feeding system for a magnetic floating type railroad system using a traffic simulation", September 1982, pp. 676 to 680.

Each substation supplies the corresponding feeding section with the electric power through a feeder extending along a railroad track between the stations. The power feeding line is divided into a plurality of feeding blocks and each of plural power converters is allocated to each corresponding feeding block. A rear side feeding block positioned behind a block where a train exists is designated as a keeping-off feeding section and the following train is prohibited from entering the section. In case of a system having four feeding blocks and four corresponding power converters, at the most only two groups of trains can be operated and the operation density of the train is limited.

If a feeding section being composed of a plurality of feeding blocks are allocated to each corresponding power converter and each block switch is connected between neighboring two blocks, it is possible to change the length of the feeding section by controlling on-off statuses of block switches without fixing the feeding section boundary between neighboring substations. In the above case, a rear side feeding block behind a block where a group of trains exists is designated as a keeping-off section, too. In this case, however, at the most four groups of trains are operable at the same time.

The system with a changeable boundary of the feeding section is able to increase the train operation density partially and is effective as described in the above papers when the train is delayed at a state of emergency in speed limit.

Further, in a power supply system of a traditional railroad system in which one substation is allocated to one corresponding feeding section and a plurality of trains are able to be operate within one feeding section, substation linkage system in which the feeding system for the trains is automatically changed on the basis of the comparison result between the feeding ability of a central substation and neighboring two substations are known as shown in Hitachi hyouron, Vol. 63, No. 11, pp. 39 to 44 (November 1981) entitled "Neighboring Interlocking control system for Tohoku-Jouetsu Shinkansen". The first traditional system fails to disclose the way in determining the feeding section of neighboring power converter unit to operate the train with safety and high density operation during the heavy traffic operation to intermittent operation of the train and power supply ability decrease of power converter fault.

On the other hand, the second traditional system is directed to the ordinary railroad system different from the linear motor type and it is not applicable to the linear motor type transportation system.

SUMMARY OF THE INVENTION

An object of the present invention is to provide a feeding section determining system capable of operating the trains with safety and high density regardless of the change of train conditions and power converter unit conditions.

In order to accomplish the above object of the present invention, the present invention provides a power supply system for a linear motor type transportation system comprising a series of driving coils disposed along a railroad track for producing a moving magnetic field to drive a train, a plurality of feeding blocks disposed along said railroad track for supplying electric power to said series of driving coils, a plurality of power supply means connected to said feeding blocks to supply electric power to each corresponding feeding section composed of said feeding blocks, a plurality of block switches connected between neighboring two feeding blocks of said plurality of feeding blocks, means for operating a rear side boundary candidate of a front one of said plurality of power supply means between said front and a neighboring rear power supply means behind said front power supply means on the basis of the position information of a train being present in the feeding section of said front power supply means, means for operating a front side boundary candidate of said rear power supply means between said front and rear power supply means on the basis of the position information of a train being present in the feeding section of said second power supply means, a section boundary determining unit for selecting one boundary in the two boundary candidates, a feeding block switch control unit for controlling on-off of said block switches so as to define the feeding section boundary between neighboring two feeding blocks.

BRIEF DESCRIPTION OF THE DRAWINGS

FIG. 3 is a block diagram showing the relation of an input and output of the boundary candidate operation unit according to the present invention;

FIG. 4 is a partial schematic diagram explaining a standard boundary;

FIG. 5 is a partial schematic diagram explaining a most backward front side boundary;

FIGS. 6 and 7 are partial schematic diagrams explaining the most forward rear side boundary;

FIG. 11 is a partial schematic diagram explaining a feeding section control method according to the present invention;

FIGS. 13 through 19 are partial schematic diagram explaining a feeding control method according to the present invention;

DETAILED DESCRIPTION OF THE PREFERRED EMBODIMENTS

Figure 1:
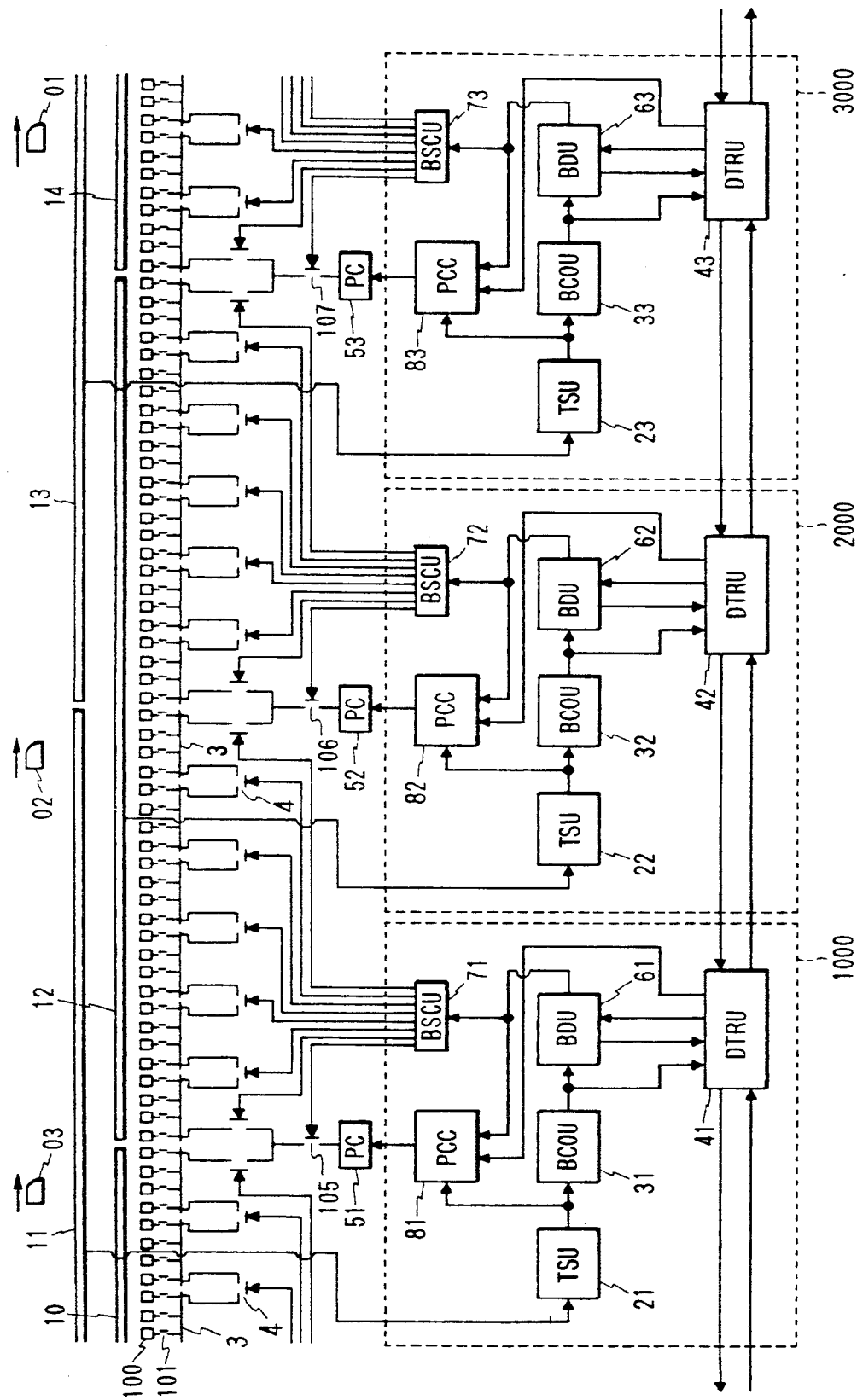
FIG. 1 is a schematic diagram showing one embodiment of the power supply system for a linear motor type transportation system according to the present invention.

FIG. 1 shows a schematic diagram of one embodiment of the power supply system of the present invention. The schematic diagram of FIG. 1 shows a power feeding system and a feeding section control system for a ground primary linear motor type transportation apparatus. The power feeding system has a feeder 3 disposed along a railroad track, block switches 4, power converter units 51, 52, 53 and so forth. The feeder 3 is divided into a plurality of feeding blocks and each of the block switches 4 is connected between two neighboring feeding blocks. A feeding section is composed of a plurality of the feeding blocks and each of corresponding substation or power converter units 51, 52 and 53 supply the electric power to the feeding section. As shown in FIG. 1, each feeding block energizes four driving coils 100 arranged along the track to generate a moving magnetic field for driven trains 01, 02, 03. Each length of the train and driving coil are 400 m and 100 m, for example. A plurality of switches 101 are connected between each driving coil 100 and the feeding block to control the energization of the driving coils 100.

Each of a plurality of main controllers 1000, 2000 and 3000 dispersedly arranged along the railroad track includes a train position detectors 10, 11, 12, 13 and 14, train supervisory units 21, 22 and 23, boundary candidate operation units 31, 32 and 33, data transmit-receive units 41, 42 and 43, boundary determining units 61, 62 and 63, block switch control units 71, 72 and 73, and power converter control units 81, 82 ad 83.

All the trains 01, 02 and 03 run from left to right as shown in the figures by arrows, and forward direction of travel means left to right movement direction in the embodiment. However, if the moving direction of the train is reversed, the meaning of forward is also reversed.

Figure 2:
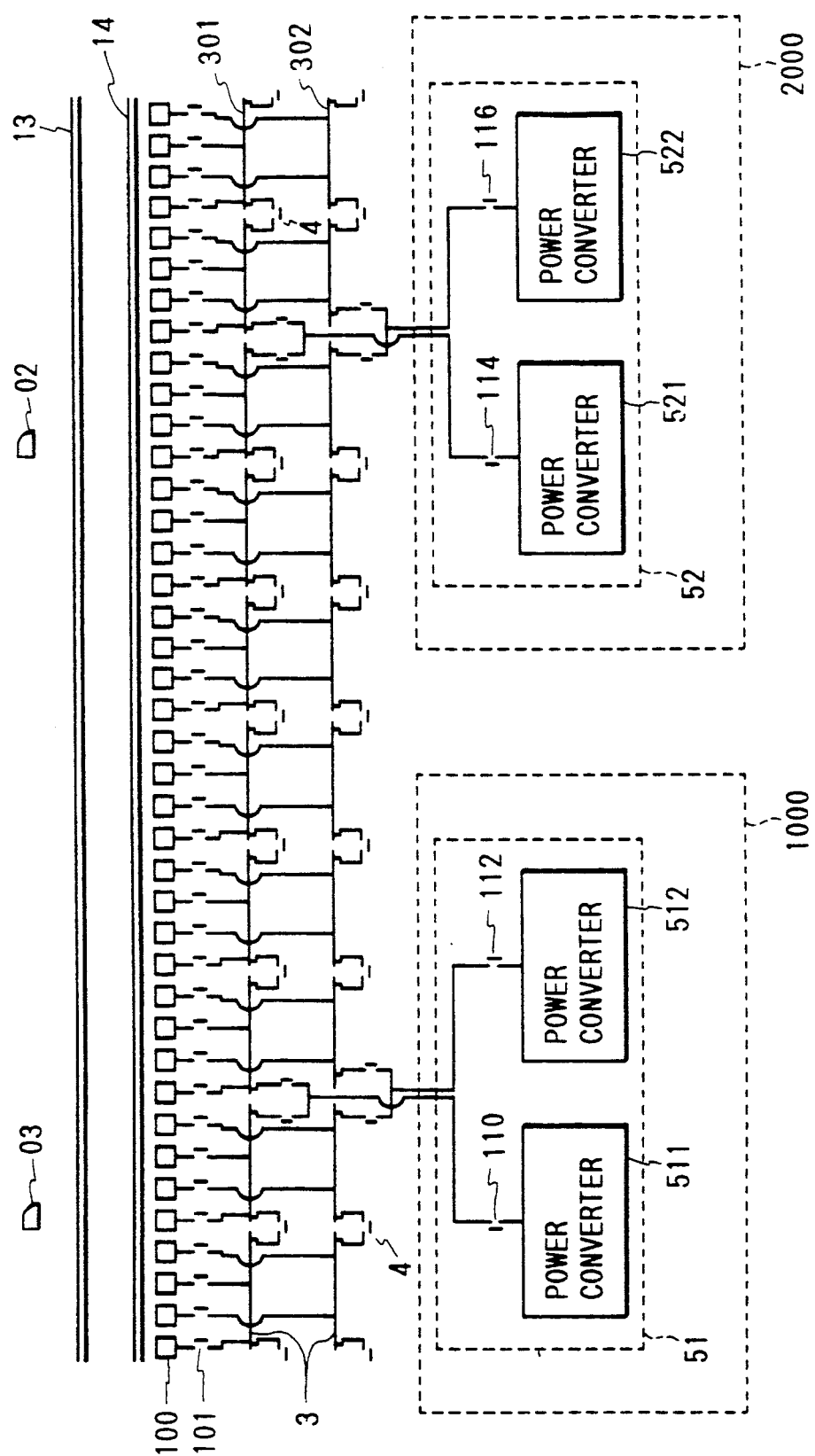
FIG. 2 is a detail schematic diagram showing another embodiment of the feeding system of the present invention.
Figure 7:
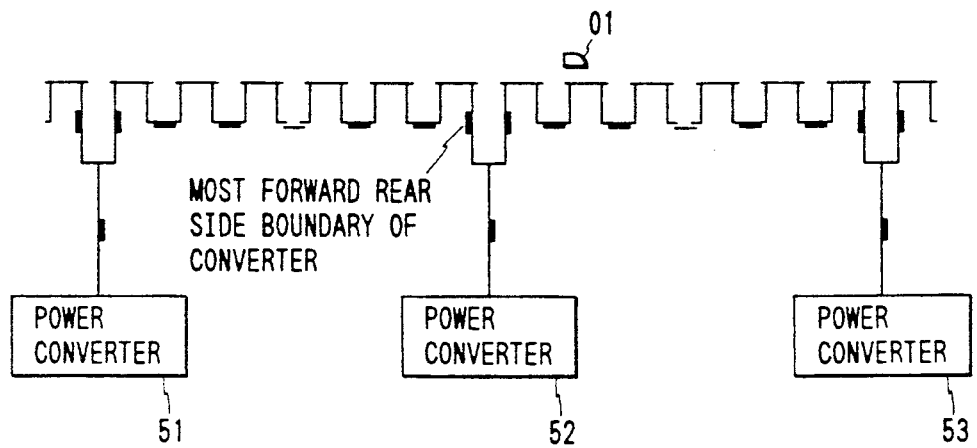

Each of the controllers 1000, 2000 and 3000 shown in FIG. 1 is coupled to only one of power converter units 51, 52 and 53, respectively, and each of power converter units 51, 52 and 53 may have a plurality of power converter units as shown in FIG. 2. The feeding system which has a couple of power converters 511 and 512, or 521 and 522 is referred to as a compound feeding system. The feeder 3 comprises a pair of feeder members 301 and 302 and the driving coils 100 are alternately connected to the feeder members 301 and 302 through switches 101 connected between the driving coil 100 and feeder members 301 and 302. The power converter units 511, 512, 521, 522 are connected to the feeder members 301 and 302 through switches 110, 112, 114 and 116.

The main controllers 1000, 2000 and 3000 make boundaries of feeding section by rendering the block switch 4 connected between neighboring feeder blocks off. The feeding blocks 10 are separated electrically by the opened block switches. A feeding section boundary between neighboring two power converter units defines feeding sections to which respective corresponding power converter units are capable of feeding electric power. That is, each of the power converter units can supply the electric power to the corresponding train existing within the corresponding feeding section defined by its front side boundary and rear side boundary. To control a feeding section boundary, the block switch corresponding to the feeding section boundary needs to be opened.

For example, only the block switches corresponding to the feeding section boundaries are opened and all other block switches are closed, or a minimum number of block switches necessary for feeding electric power to feeding blocks corresponding to the tail position to the stop position of the train to be controlled are closed and all other block switches are opened. The driving coils positioned near a place to which the train is approaching are energized through corresponding switches.

The position detector 12 generates a position signal train and supplies the position signal to the train supervisory unit 22. The train supervisory unit 22 makes a output signal indicative of the train position and train speed in response to the position signal of the train 02. The boundary candidate operation unit 32 generates a front side boundary candidate and rear side boundary candidate with respect to the feeding section in response to the train position signal. The front side boundary candidate is determined by selecting a block switch 4 to be opened between the power converter units 52 and 53. The block switch defines the front side boundary of the feeding section. A rear side boundary candidate is determined by selecting a block switch to be opened between the power converter units 51 and 52. The selected block switch defining the rear side boundary of the feeding section will be described later in detail.

The data transmit-receive unit 42 performs transmitting and receiving of the data between main controllers 1000, 2000 and 3000. The front side candidate from the boundary candidate operation unit 32 and the rear side boundary candidate generated by the boundary candidate operation unit 33 through the data transmit-receive units 42 and 43 are both supplied to the boundary determining unit 62. These candidates are boundary candidates determined with respect to the power converter units 52 and 53. The boundary determining unit 62 selects either of the candidates and determines the boundary of the feeding section between the power converter units 52 and 53 and supplies an output signal to the block switch control unit 72 and the power converter unit 52. The output signal is supplied to the the power converter control unit 83 through the data transmit-receive units 42 and 43.

The block switch control unit 72 performs on-off control of the block switch groups in response to the determined boundary between feeding section of the power converter units 52 and 53. The power converter control unit 82 controls the power converter unit 52 in response to the train position information signal from the train supervisory unit 22, boundary signal of the feeding section between the power converter units 52 and 53 from the boundary determining unit 62 and the boundary signal of the feeder section from the the boundary determining unit 61 through the data transmit-receive units 41 and 42.

If a block switch stays in an off-state because of a malfunction, the broken-down block switch is designated as the feeding section boundary. On the other hand, when the block switch stays in an on-state due to a short, three feeding blocks including neighboring two feeding blocks are processed as one feeding block in determining a feeding section boundary.

A standard boundary means a predetermined boundary determined by the boundary candidate operation unit 32 shown in FIG. 1 at the normal operation of the train. For example, the standard boundary is a boundary dividing the feeding section between the power converter units 51 and 52 into two equal parts as shown in FIG. 4. Basically, the standard boundary divides the feeding section into two equal parts, however, it may be changed according to the geographical condition and power supply ability of the converter when designing the system. In any case, the standard boundary needs to be determined beforehand. The standard boundary between the power converter unit 52 and power converter unit 53 is a standard front side boundary of the power converter 52 and the standard boundary between the power converter unit 52 and power converter unit 51 is a standard rear side boundary of the power converter unit 52.

An allowable most backward front side boundary means a block switch positioned at the front end of the feeding block which corresponds to the stop position when the train 01 starts braking in accordance to the standard decelerating pattern as shown in FIG. 5. The allowable most backward front side boundary ensures a minimum distance sufficient to decelerate and stop the train safely. Therefore, the allowable most backward front side boundary may be changed in response to the train speed.

An allowable most forward rear side boundary is a boundary to ensure a minimum distance feeding way sufficient to supply electric power to the corresponding train being present in the feeding section. When the train is behind the power converter unit 52 supplying the power to the train on the feeding line, a block switch positioned at the front end of the feeding block which corresponds to the train position is selected as the allowable most forward rear side boundary as shown in FIG. 6. When the train 01 is ahead of the power converter unit 52 supplying the electric power to the train 01, a block switch positioned at the front end of the feeding block behind and closest to the power converter switch 52 becomes an allowable most forward rear side boundary.

Figure 8:
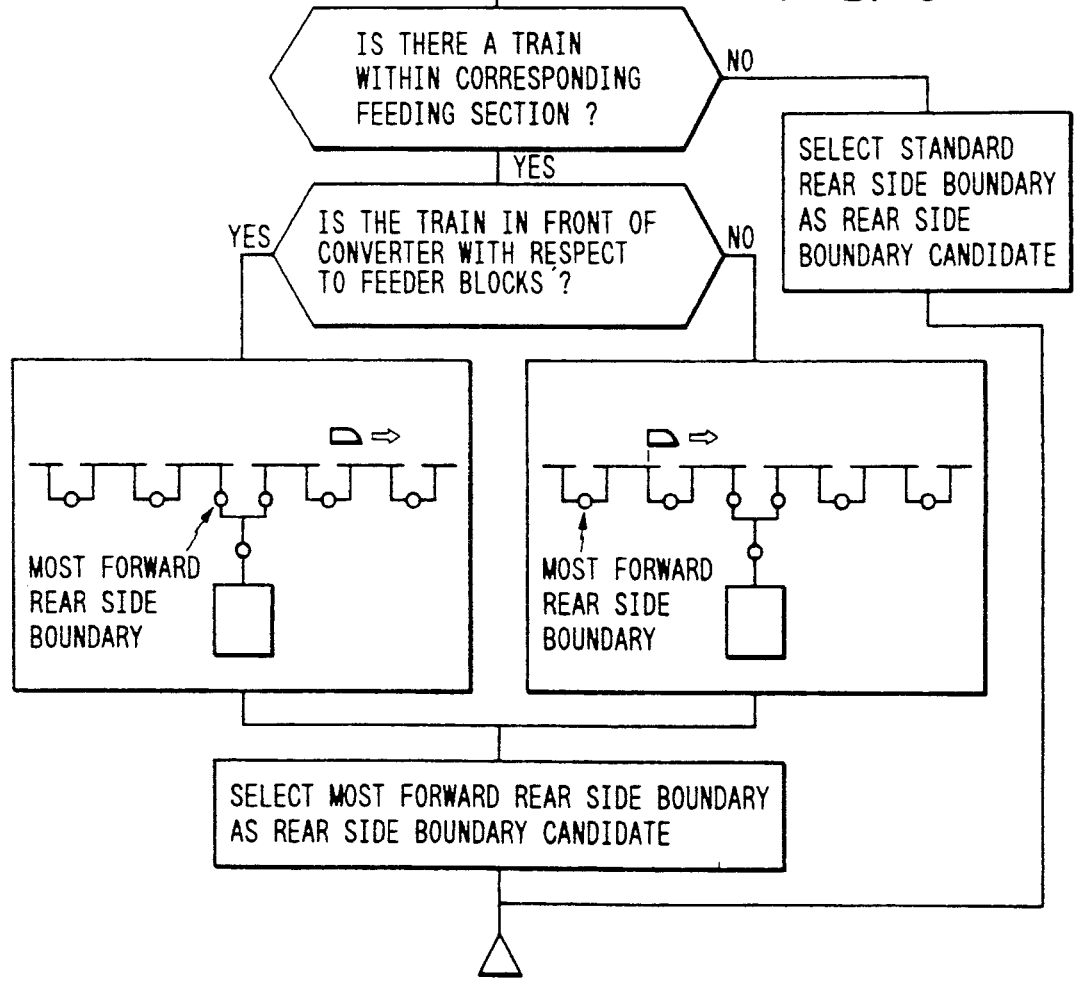
FIGS. 8 and 9 are flow charts explaining the operation of a boundary candidate operation unit.
Figure 9:
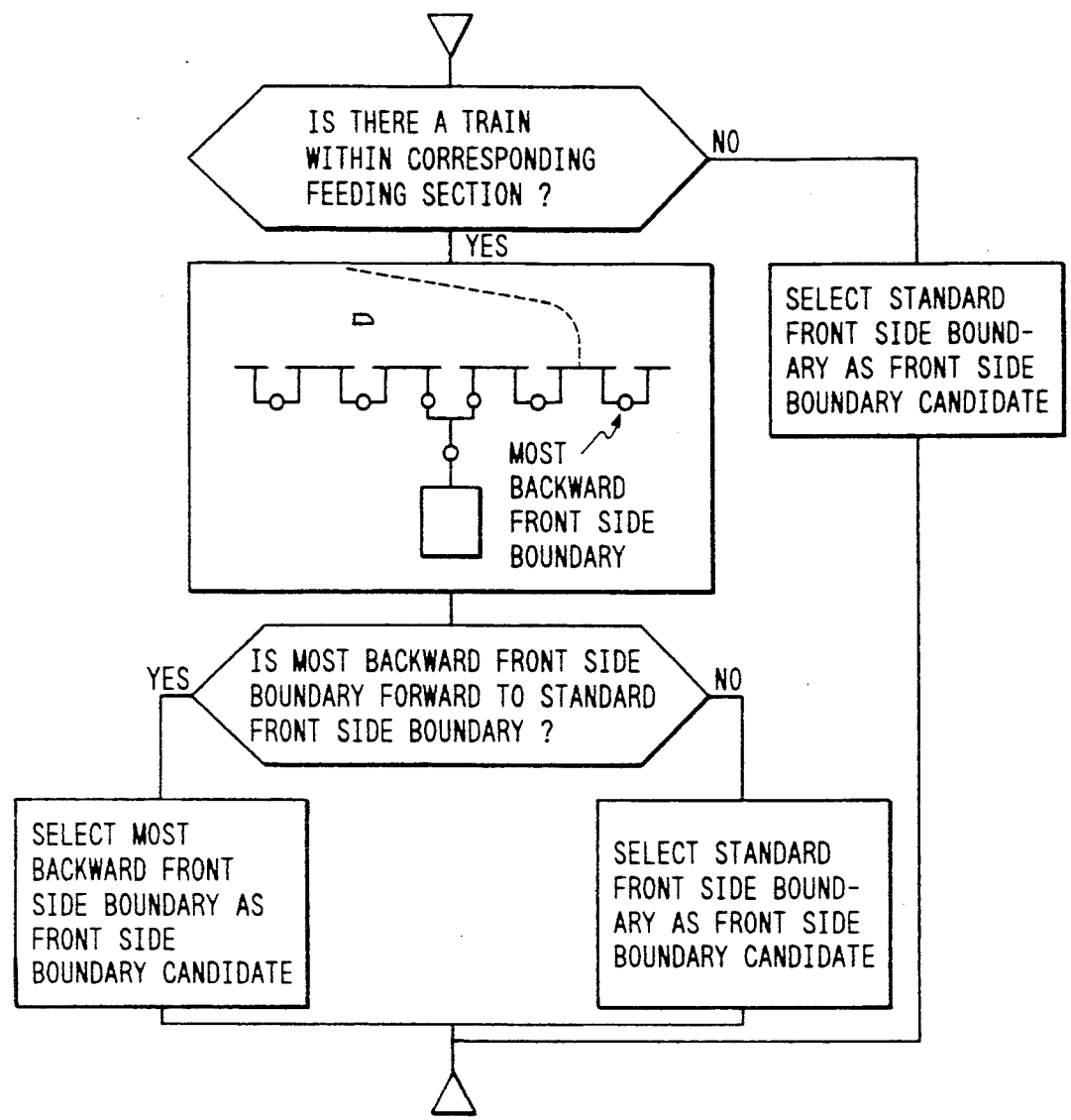

The boundary candidate operation unit 32 calculates a rear side boundary candidate and front side boundary candidate of the feeding section with respect to the power converter unit 52, that is, the boundary candidate between the power converter units 51 and 52 and the boundary candidate between the power converter units 52 and 53. The calculation method of the rear side boundary candidate and the front side boundary candidate for the boundary candidate operation unit 32 are shown in FIG. 8 and 9, respectively. The feeding section boundary candidate operation unit 32 determines whether a train is present within the corresponding feeding section defined by a predetermined standard front side boundary between the power converter units 52 and 53 and a predetermined standard rear side boundary between the power converter units 51 and 52 as shown in FIG. 8. If no train exists in the feeding section, the boundary candidate operation unit 32 selects the predetermined standard rear side boundary as a rear side boundary candidate and supplies the signal to the boundary determining unit 61 of the main controller 1000 through the data transmit-receive units 42 and 41. When a train exists within the section, it is determined whether the train is in advance of the corresponding power converter unit 52 with respect to the feeding block lines or not. The boundary candidate operation unit 32 selects the most forward rear side boundary as a rear side boundary candidate regardless of the train position and supplies an output signal to the boundary determining unit 61 through the data transmit-receive units 42 and 41. The most forward rear side boundary, however, is shifted in accordance with the movement of the corresponding train position. As shown in FIG. 9, the boundary candidate operation unit 32 also determines whether a train is present within the corresponding feeding section defined by the predetermined standard front side boundary between the power converter units 52 and 53 and the predetermined standard rear side boundary between the power converter units 51 and 52. If no train exists in the feeding section, the boundary candidate operation unit 32 selects the predetermined standard front side boundary as a front side boundary candidate and supplies the signal to the boundary determining unit 62. When a train exists within the section, it is determined whether the most backward front side boundary is forward to the standard front side boundary of the power converter unit 52 with respect to the feeding lines or not. The boundary candidate operation unit 32 selects the most backward front side boundary as a front side boundary candidate when the most backward front side boundary is in advance of the standard front side boundary. If the most backward front side boundary is behind the standard front side boundary, the boundary candidate operation unit 32 selects the standard front side boundary as a front side boundary candidate and supplies the output to the boundary determining unit 62. The most backward front side boundary is shifted in response to the the position and speed of the train to be driven. When no train is present in the feeding section, the standard rear side boundary becomes a rear side boundary candidate and the standard front side boundary becomes a front side boundary candidate as is apparent from the above description.

Figure 10:
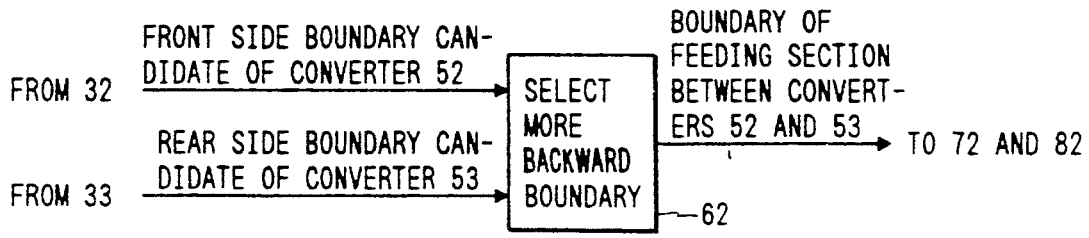
FIG. 10 is a block diagram explaining the relation between an input and output of a boundary determining unit.

As shown in FIG. 10, the boundary determining unit 62 determines the feeding section boundary between the power converter unit 52 and 53 in response to the front side boundary candidate of the power converter unit 52 and the rear side boundary candidate of the power converter unit 53.

The front side boundary candidate of the power converter unit 52 determined by the boundary candidate operation unit 32 or the boundary candidate between the power converters 52 and 53 calculated on the basis of the power converter 52 is supplied to the boundary determining unit 62. The rear side boundary candidate of the power converter 53 determined by the boundary candidate operation unit 33 or the boundary candidate between the power converter 52 and 53 calculated on the basis of the power converter unit 53 is also supplied to the boundary determining unit 62. A more backward one of the two boundary candidates is selected by the boundary determining unit 62 and the selected boundary is supplied to the block switch control unit 72 and the power converter control unit 82 to carry out the boundary determination between the power converters 52 and 53 on the feeding line. The block switch control unit 72 renders the group of the block switches on state or off state in response to the boundary of the feeding section between power converter units 52 and 53 determined by the boundary determining unit 62.

The feeding section boundary between power converter units 52 and 53 from the boundary determining unit 62 and the feeding section boundary between the power converter units 51 and 52 from the boundary determining unit 61 through the data transmit-receive units 41 and 42 are supplied to the power converter control unit 82. Also, the power converter control unit 82 controls the power converter unit 53 in response to the train position information signal from the train supervisory unit 22. The power converter control unit 82 determines the train to be controlled and as a result controls the subject train. The power converter control unit 82 detects the number of train groups in the controllable section of the same power converter unit on the basis of the information from the train supervisory unit 22 and if only one group of the train is in the feeding section, the control unit controls the group of train. In case two groups of train are in the feeding section, the power converter control unit determines the control region on the basis of the information of the boundary determining units 61 and 62 and allocates group of the train existing within the control region as a group of train to be controlled.

FIG. 11 shows an example of the feeding section control when no train is running in the feeding section. At this time, the front side boundary candidate of the power converter unit 52 selected by the boundary candidate operation unit 32 coincides with the rear side boundary candidate of the power converter unit 52 selected by the boundary candidate operation unit 33 and the predetermined standard boundary is selected by the boundary determining unit 62. Therefore, a predetermined block switch is opened to define the feeding boundary between the power converter units 52 and 53.

Figure 12:
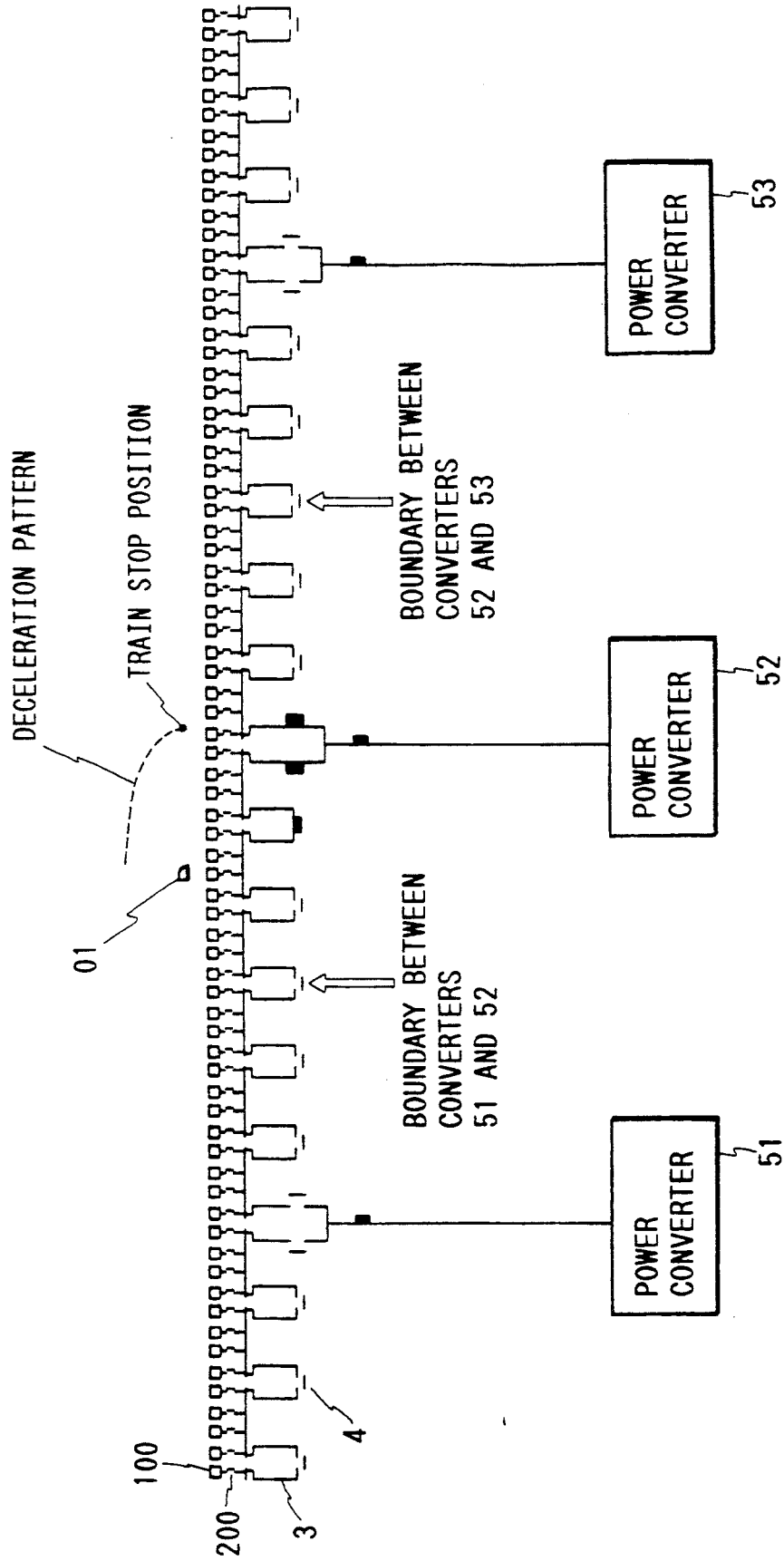
FIG. 12 is a partial schematic diagram showing another embodiment of the power supply system for a linear motor type transportation system of the present invention.

FIG. 12 shows another way to define the feeding section boundary by closing a minimum number of block switches necessary for feeding electric power to feeding blocks corresponding to the tail position to the stop position of the train to be controlled and by opening all the other block switches. FIGS. 13 and 14 show an example of the control when a train is present within the feeding section of the power converter unit 52. In FIG. 13, the most backward front side boundary of the power converter unit 52 is behind the standard front side boundary of the power converter unit 52. To the contrary, in FIG. 14 the most backward front side boundary of the power converter unit 52 is forward to the standard front side boundary of the power converter unit 52.

In FIG. 13, the most backward front side boundary of the power converter unit 52 is not forward to the standard front side boundary on the feeding line and as a result, the boundary candidate operation unit 32 selects the standard front side boundary as a front side boundary candidate and supplies the boundary signal to the boundary determining unit 62. On the other hand, the boundary candidate operation unit 33 selects the predetermined standard rear side boundary as a rear side boundary by the method of FIG. 8 and supplies the boundary signal to the boundary determining unit 62 through the data transmit-receive units 42 and 41. The boundary determining unit 62 selects the standard front side boundary feeding section boundary between the power converter units 52 and 53. Therefore, the corresponding block switch is opened as shown in FIG. 13. The boundary is moved in response to the movement of the train 01.

In FIG. 14, the most backward front side boundary of the power converter unit 52 goes beyond the standard front side boundary of the power converter unit 52. The boundary determining unit 62 selects the predetermined standard front side boundary as the boundary between the power converter unit 52 and 53. Therefore, the boundary is not changed and the same boundary is kept as shown in FIG. 13.

In FIG. 15, the train goes forwards beyond the standard front side boundary of the power converter unit 52 or the standard rear side boundary of the power converter unit 53 and moves from the feeding section of the power converter unit 52 to the feeding section of the power converter unit 53. At this time, the standard front side boundary of the power converter unit 52 and the most forward rear side boundary of the power converter unit 53 are selected as the front side boundary candidate and rear side boundary candidate respectively. The boundary determining unit 62 selects the standard front side boundary of the power converter unit 52 as the feeding section boundary between the converter units 52 and 53.

Figure 16:
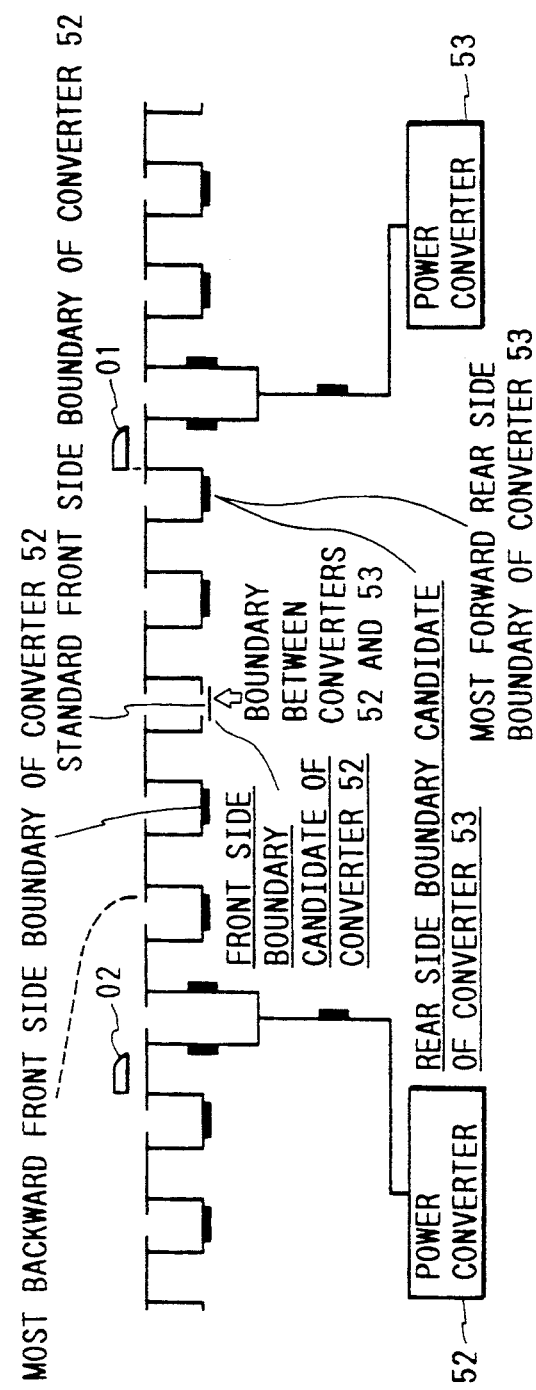

FIG. 16 explains the case when a train is present in each feeding section of the power converter units 52 and 53. The most backward front side boundary of the neighboring backward power converter unit 52 is behind the standard front side boundary of the power converter unit 52. The standard front side boundary of converter unit 52 and the most forward rear side boundary of converter unit 53 are selected as the front side boundary candidate and rear side boundary candidate. The boundary determining unit 62 selects the standard front side boundary as the boundary between the power converter unit 53 and 52.

Figure 17:
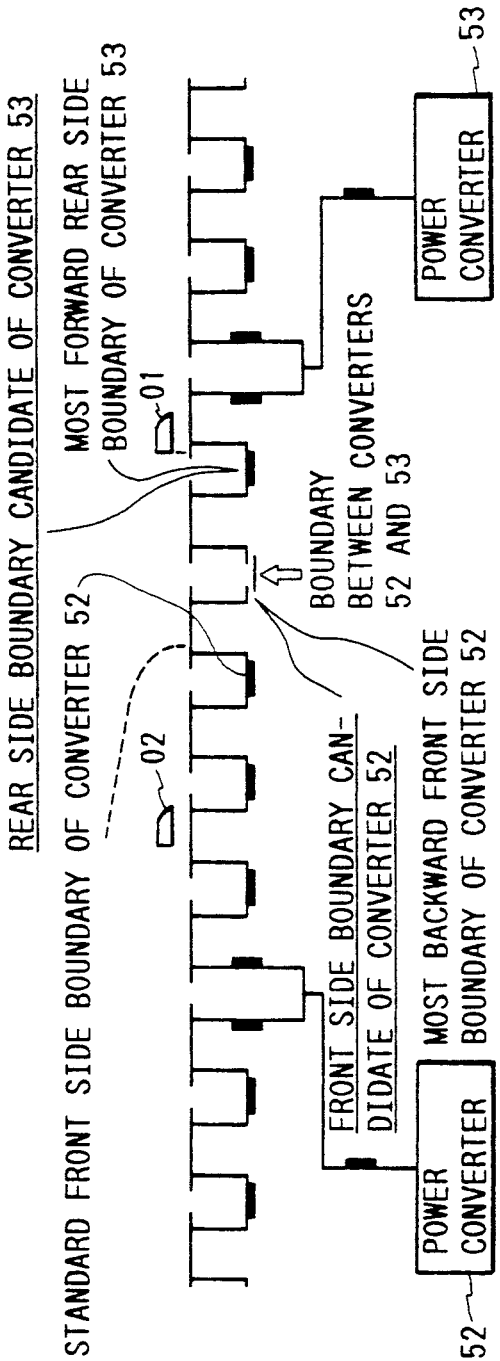

FIG. 17 shows a case when the preceding train 01 stays in the prior feeding block because of a delay and the following train goes ahead and the most backward front side boundary of the power converter unit 52 exceeds beyond the standard front side boundary of it. At this time, the following train is able to continue going ahead without deceleration because the feeding section boundary between the power converter units 52 and 53 have moved one block ahead. FIG. 18 shows a case when the preceding train 01 stays in the same block because of a further delay, and the following train 02 goes ahead and the most backward front side boundary of the 52 goes beyond the feeding section boundary between the power converter units 52 and 53 of FIG. 17. At this time, the feeding section boundary of the power converter units 52 and 53 have moved one block ahead in comparison with the boundary shown in FIG. 17 and the following train 02 is able to travel without deceleration.

When the preceding train 01 stays in the prior feeding block because of a further delay and the following train 02 goes ahead, it is impossible to move the feeding section boundary between the power converter units 52 and 53 one more block ahead.

At this time, the following train is decelerated by a decelerating pattern, for example ATC(Automatic train control) or ATS(Automatic train stop control,) so as to stop within the feeding section of the power converter unit 52. FIG. 19 shows a case when the preceding train 01 and the following train 02 go ahead and the preceding train 01 is in front of the power converter unit 53 with respect to the power feeder line. In the above case, a feeding boundary position is at the block switch shown by an arrow.

The feeding section boundary of the power converter unit 52 extends to near the front the power converter unit 53 and following train 02 is able to travel safely to the preceding train as close as possible.

According to the above embodiment, the present feeding section control system allows all trains to travel safely with a minimum interval between them without deceleration of the train and is able to increase the operation density of the trains.

In the above embodiment, when an emergency condition occurs in the power converter units, the system operates as follows.

First, the feeding ability decrease of the power converter stems from the partial fault of the power converter units and the feeding ability decrease of the power substation, for example, the feeding ability reduction of the power station during the maximum speed acceleration of the train. Therefore, feeding ability supervisory unit composed of comparing means for comparing a current command to a power converter unit with a real output of the power converter unit and means for collecting informations relating to a power margin degree from a power station and for detecting reduction of the feeding ability is provided in each control unit 1000, 2000 and 3000.

Figure 20:
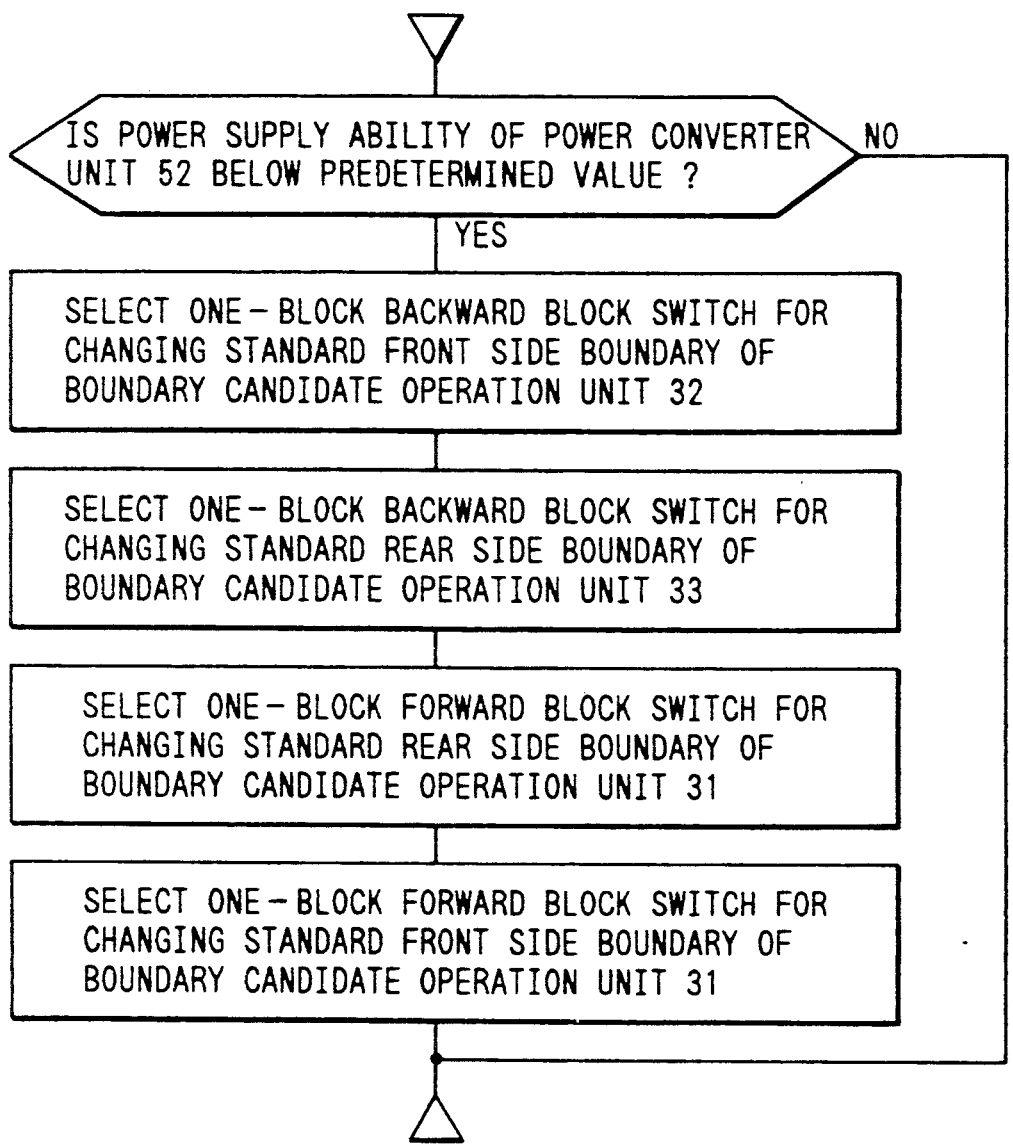
FIG. 20 is a flow chart explaining a process of a feeding ability supervisory unit.

When the feeding ability of the power converter unit 52 falls below a predetermined value, the feeding ability supervisory unit proceeds the standard feeding section boundary between the power converter units 51 and 52 one block ahead and proceed the standard boundary of the feeding section between the power converter units 52 and 53 one block back according to the processing method of FIG. 20. As shown above, the feeding section length of the power converter unit 52 during the train running is shortened by one block forward and backward during normal operation and average loading time impressed to the power converter unit 52 is reduced because the operation time of the power converter unit 52 is shortened.

In the high density operation, the feeding section boundary between the power converter units 51 and 52 does not become behind the standard boundary between the power converter units 52 and 51 shifted one block forward as described above. Further, when no train is present within the feeding section of the power converter unit 53, the above shifted boundary which is moved to one block backward becomes the feeding section of the power converter units 52 and 53 and the average power load of the power converter unit 52 is reduced. However, when the feeding section of the power converter unit 52 is shortened, the feeding section of the power converter units 51 and 52 is extended and the maximum operation density of the train is reduced. The feeding section control system according to the present invention described above makes it possible to maintain the high operation density of the train even if the feeding ability of the power converter unit is reduced.

In the above embodiment, when the feeding ability of the power converter unit is reduced, the standard boundary is shifted to backward or forward one by one block. The standard boundary may be shifted the number of blocks at once in response to the degree of the feeding ability reduction. At this time, even if the feeding ability is considerably reduced, it is able to travel the train without reducing the train movement speed.

Figure 21:
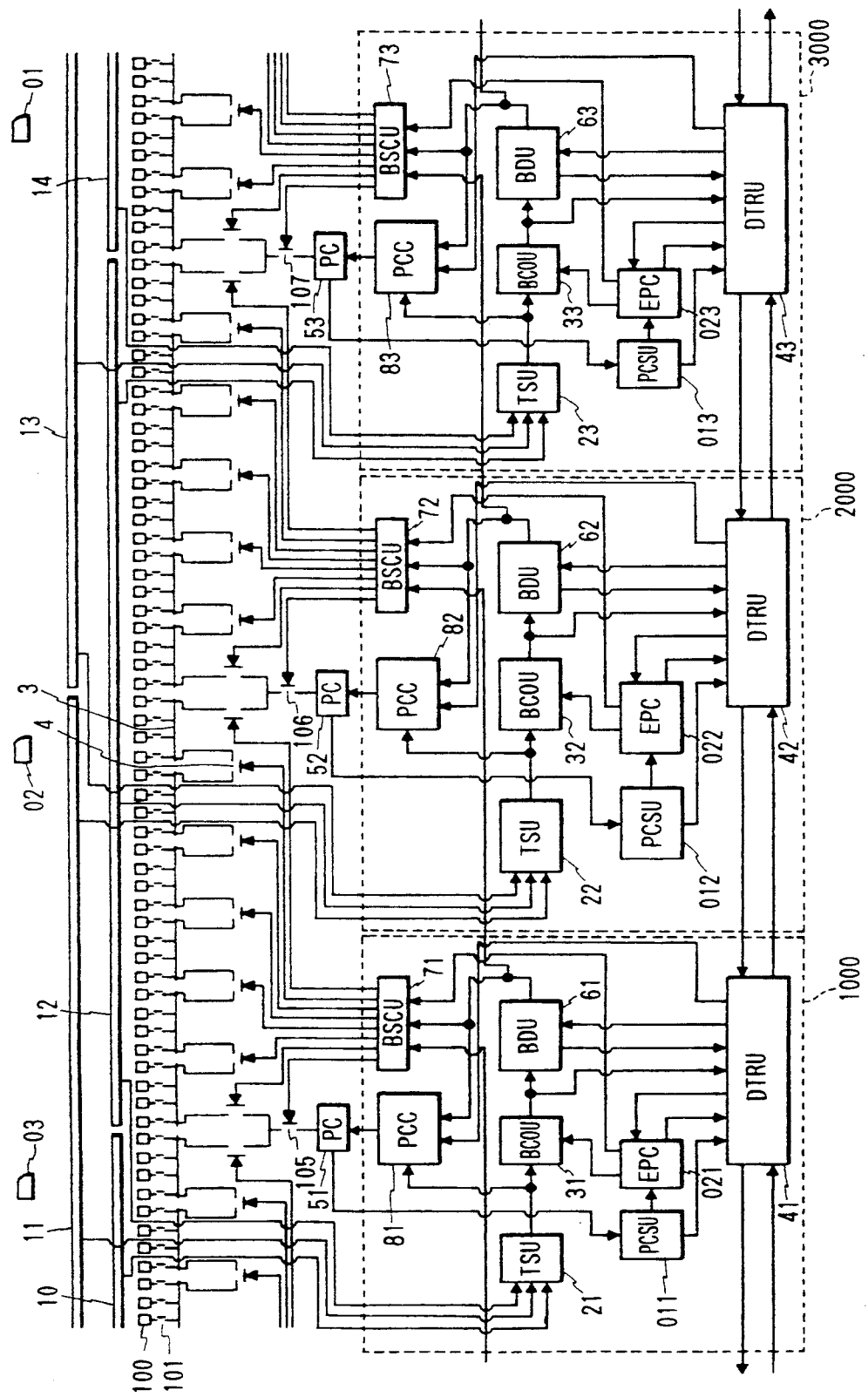
FIG. 21 is a schematic diagram showing a further embodiment of the power supply system for a linear motor type transportation system of the present invention.

When feeding becomes impossible by causing of the failure of the power converter unit, the emergency operation by the present invention is as follows:

New elements added to FIG. 1 are a power converter supervisory unit 012 and emergency processing unit 022 as shown in FIG. 21. The block switch control unit 72 is structured so as to be able to receive directly the opening and closing order supplied from the boundary determining unit 61 and 62. The train supervisory unit 22 can directly receive the train position detecting signal outputted by the train position detectors 11, 12 and 13.

The power converter supervisory unit 012 always supervises the power converter unit 52 and supplies generated emergency signal to the emergency processing unit 022 and transmits the signal to emergency processing units 021 and 022 through data transmit-receive units 41, 42 and 43 when an emergency signal is generated by a power feeding failure and fault of the power converter unit 52. The operations of the feeding control system when the power converter unit 52 is not able to supply power and the power converter supervisory unit 012 deals with the emergency operation are as follows:

The emergency processing unit transmits immediately the restoring signal to the emergency processing unit 022 through the data transmit-receive units 42 and 43 if no train exists within the feeding section of the power converter unit at the time when the emergency processing unit 023 receives the emergency signal. Additionally, the emergency signal is supplied to the boundary candidate operation unit 33 to change the standard boundary as described later in detail. On the other hand, if a train exists within feeding section of the power converter unit 53, after the train is moved to the forward feeding section, above processing is immediately carried out. On receiving the restoring signal, the emergency processing unit 022 supplies the signal to the block switch control unit 72 and thereafter allow the the block switch control unit 72 to operate according to the block switch opening and closing order supplied by the boundary determining unit 61 and at the same time supplies the restoring signal to the emergency processing unit 021 through the data transmit-receive units 42 and 43. Further, the emergency processing unit 022 transmits the emergency signal to the data transmit-receive unit 42 and allow the data-receive unit 42 to only have a function as a data transmission line for the data transmit-receive units 41 and 42. The emergency processing unit 021 transmits the restoring signal to the the boundary candidate operation unit 31 to changes the standard boundary.

The changed standard boundary above means the standard boundary of the power converter units 51 and 52 and the standard front side boundary of the boundary candidate operation unit 31 and the standard rear side boundary of the the boundary candidate operation unit 33 are changed to above standard boundary between the power converter units 51 and 53. As described above, the power converter unit 52 impossible of the feeding is removed from the feeding system. At this time, the new feeding boundary is determined between the power converter units 51 and 53.

The present feeding section control system according to the above embodiment is able to maintain the high operation density of the train at a predetermined value when a power converter unit becomes impossible to feed the electric power to the feeders. Also, according to the above embodiment, if the operation of the 022 is ensured, the total system can continue its operation when the fault of the dispersedly disposed 2000 and make a maintenance job and a function enlargement job of the power converter units and control units during its operation.

When beaking of a signal transmitting wire for supplying an on-off command from a block switch control unit to a block switch and fault of the block switch make it impossible to control opening and closing of the block switch. In any case, the emergency states are detected by comparing the on-off command signal with the real on-off states of the block switch. A block switch supervisory unit including a comparing means for detecting the real on-off state of the block switch to define the corresponding feeding section boundary and comparing an on-off command of the block switch control unit with the real on-off state of the corresponding block switch is added to the each main controllers 1000, 2000 and 3000 in FIG. 1. Now the operation of the main controller 1000 is described hereinafter, for example. When the block switch supervisory unit detects a fault of the on-off operation of the block switch between the power converter units 52 and 53 and the block stays at open position, it supplies a command signal which designates the block switch as the new corresponding block switch defining a new feeding section boundary between the power converter units 52 and 53 to the boundary determining unit 62. The above determined command has a priority over the boundary command determined by the process in FIG. 10. If the block switch stays at closed position, the block switch supervisory unit supplies the detected emergency signal of the block switch to the boundary candidate operation units 32 and 33. The boundary candidate operation units 32 and 33 regard a front and rear feeding blocks with respect to the block switch as one block and operate front and rear side boundary candidates in response to the emergency signal from the block switch supervisory unit. That is, if a block switch corresponding to the front side boundary candidate of the power converter unit 52 operated by the process of FIG. 9 coincides with a inoperable block switch which stays at closed porition, the boundary candidate operation unit 32 outputs a block switch one block ahead of the inoperable switch as a front side boundary candidate. If a block switch corresponding to the rear side boundary candidate of the power converter unit 53 operated by the process of FIG. 8 coincides with a inoperable block switch which stays at closed position, the boundary candidate operation unit 33 outputs a block switch one block behind of the inoperable switch as a rear side boundary candidate. According to the above embodiment, in case the block switch is inoperable, the train is operated safely.

In the above embodiments the distributed control system is used, however, it is possible to carry out the feeding section control by a centralized control system in place of the distributed control system.

We claim:

1. A power supply system for a linear motor type transportation system comprising:

a series of driving coils disposed along a railroad track for producing a moving magnetic field to drive a train;

a plurality of feeding blocks disposed along said railroad track for supplying electric power to said series of driving coils;

a plurality of power supply means connected to said feeding blocks to supply electric power to each corresponding feeding section composed of said feeding blocks;

a plurality of block switches connected between neighboring two feeding blocks of said plurality of feeding blocks;

means for operating a rear side boundary candidate of a front one of said plurality of power supply means between said front and a neighboring rear power supply means behind said front power supply means on the basis of the position information of a train being present in the feeding section of said front power supply means;

means for operating a front side boundary candidate of said rear power supply means between said front and rear power supply means on the basis of the position and speed information of a train being present in the feeding section of said second power supply means;

a section boundary determining unit for selecting one boundary from the two boundary candidates; and a feeding block switch control unit for controlling on-off states of said block switches so as to define the feeding section boundary between neighboring two feeding blocks.

2. A power supply system for a linear motor type transportation system according to claim 1, wherein the rear side boundary candidate of the front power supply means is varied on the basis of the position of the train being present in the feeding section of said front power supply means.

3. A power supply system for a linear motor type transportation system according to claim 1, wherein a neighboring supply means adjacent to said front power supply means is designated and controlled as a new front power supply means when said front power supply means has no feeding ability.

4. A power supply system for a linear motor type transportation system according to claim 1, wherein said feeding block switch control unit keeps the corresponding block switch in an off-state in response to the section boundary determined by said boundary determining unit.

5. A power supply system for a linear motor type transportation system according to claim 1, wherein said feeding block switch control unit keeps the block switch corresponding to the determined boundary in an off-state in response to the section boundary determined by said boundary determining unit.

6. A power supply system for a linear motor type transportation system comprising:

a series of driving coils disposed along a railroad track for producing a moving magnetic field to drive a train;

a plurality of feeding blocks disposed along said railroad track for supplying electric power to said series of driving coils;

first and second power supply means connected to said feeding blocks to supply electric power to each corresponding feeding section composed of said feeding blocks;

a plurality of block switches connected between neighboring two feeding blocks of said plurality of feeding blocks;

a first boundary candidate operation unit for calculating a first feeding section boundary candidate of said first power supply means between said first and second power supply means on the basis of the position information of a train being present in the feeding section of said first power supply means;

a second boundary candidate operation unit for calculating a second feeding section boundary candidate of said second power supply means between said first and second power supply means on the basis of the position and speed information of a train being present in the feeding section of said second power supply means;

a section boundary determining unit for selecting one boundary from the two boundary candidates; and a feeding block switch control unit for controlling on-off states of said block switches so as to define the feeding section boundary between neighboring two feeding blocks.

7. A power supply system for a linear motor type transportation system comprising:

a series of driving coils disposed along a railroad track for producing a moving magnetic field to drive a train;

a plurality of feeding blocks disposed along said railroad track for supplying electric power to said series of driving coils;

first and second power supply means connected to said feeding blocks for supplying electric power to each corresponding feeding section composed of said feeding blocks, said first power supply means being arranged in front of said second power supply means with respect to the track;

a plurality of block switches connected between neighboring two feeding blocks of said plurality of feeding blocks;

a first boundary candidate operation unit for selecting a rear side boundary candidate including:
  means for determining whether a train is present in the corresponding feeding section of said first power supply means;
  means for selecting a standard rear side boundary as a rear side boundary candidate if no train is present in the corresponding feeding section; and
  means for selecting the most forward rear side boundary as the rear side boundary candidate;

a second boundary candidate operation unit for selecting a front side boundary candidate including:
  means for determining whether a train is present in the corresponding feeding section of said second power supply means;
  means for selecting a standard front side boundary as a front side boundary candidate if no train is present in the corresponding feeding section;
  means for selecting the most backward front side boundary as the front side boundary candidate if the most backward front side boundary is in front of the standard front side boundary; and
  means for selecting the standard front side boundary as the front side boundary candidate;

a section boundary determining unit for selecting one boundary from the two boundary candidates; and a feeding block switch control unit for controlling on-off states of said block switches so as to define the feeding section boundary between neighboring two feeding blocks.

8. A power supply system for a linear motor type transportation system comprising:

a series of driving coils disposed along a track for producing a moving field to drive an object to be moved;

a plurality of power supply means for supplying electric power to corresponding feeding sections each composed of a plurality of said driving coils, the feeding sections being electrically separated from each other and the section boundary between neighboring two sections being variable; and means for setting a section boundary between a rear power supply means and a front neighboring power supply means positioned in front of the rear power supply means in response to position and speed information of an object to be moved present in the feeding section of the rear power supply means.

9. A power supply system for a liner motor type transportation system according to claim 8, wherein said section boundary setting means defines a section boundary between the rear power supply means and the front power supply means in response to the position and speed information of the object to be moved present in the feeding section of the rear power supply means and position information of an object to be moved present in the feeding section of the front power supply means.

10. A power supply system for a linear motor type transportation system according to claim 8, wherein said section boundary setting means defines a section boundary between the rear power supply means and the front power supply means in response to the position and speed information of the object to be moved present in the feeding section of the rear power supply means and position information of an object to be moved present in the feeding section of the front power supply means and closest to the object to be moved present in the feeding section of the rear power supply means.

11. A power supply system for a linear motor type transportation system according to claim 8, wherein a neighboring power supply means adjacent to said front power supply means is designated and controlled as a new front power supply means when said front power supply means has no feeding ability.

12. A power supply system for a linear motor type transportation system comprising:

a series of driving coils disposed along a rail track for producing a moving field to drive a train;

a plurality of power supply means for supplying electric power to corresponding feeding sections each composed of a plurality of said driving coils, the feeding sections being electrically separated from each other and the section boundary between neighboring two sections being variable;

a plurality of switches disposed between neighboring two feeding sections for defining the boundary between the feeding sections; and means for setting a section boundary between a rear power supply means an a front neighboring power supply means positioned in front of the rear power supply means in response to position and speed information of an object to be moved present in the feeding section of the rear power supply means, said section boundary setting means controlling on-off states of said switches to vary the section boundary.

13. A power supply system for a linear motor type transportation system comprising:
   a series of driving coils disposed along a railroad track for producing a moving magnetic field to drive a train;
   a plurality of feeding blocks disposed along said railroad track for supplying electric power to said series of driving coils;
   a plurality of power supply means connected to said feeding blocks for supplying electric power to each corresponding feeding section composed of said feeding blocks;
   a plurality of block switches connected between neighboring two feeding blocks of said plurality of feeding blocks;
   means for operating a rear side boundary candidate of a front one of said plurality of power supply means between said front and a neighboring rear power supply means behind said front power supply means on the basis of position information of a train being present in the feeding section of said front power supply means;
   means for operating a front side boundary candidate of said rear power supply means between said front and rear power supply means on the basis of position and speed information of a train being present in the feeding section of said rear power supply means;
   section boundary determining means for determining a final boundary located behind the rear side boundary candidate of said front power supply means and before the front side boundary candidate of said rear power supply means; and
   feeding block switch control means for controlling on-off states of said block switches so as to define the feeding section boundary between neighboring two feeding blocks on the basis of the final boundary determined by said section boundary determining means.

14. A power supply system for a linear motor type transportation system according to claim 13, wherein the rear side boundary candidate of the front power supply means is varied on the basis of the position of the train being present in the feeding section of said front power supply means.

15. A power supply system for a linear motor type transportation system according to claim 13, wherein a neighboring supply means adjacent to said front power supply means is designated and controlled as a new front power supply means when said front power supply means has no feeding ability.

16. A power supply system for a linear motor type transportation system according to claim 13, wherein said feeding block switch control means keeps the corresponding block switch in an off-state in response to the final boundary determined by said section boundary determining means.

17. A power supply system for a linear motor type transportation system according to claim 13, wherein said feeding block switch control means keeps the block switch corresponding to the determined boundary in an off-state in response to the final boundary determined by said second boundary determining means.

18. A power supply system for a linear motor type transportation system comprising:
   a series of driving coils disposed along a railroad track for producing a moving magnetic field to drive a train;
   a plurality of feeding blocks disposed along said railroad track for supplying electric power to said series of driving coils;
   first and second power supply means connected to said feeding blocks for supplying electric power to each corresponding feeding section composed of said feeding blocks;
   a plurality of block switches connected between neighboring two feeding blocks of said plurality of feeding blocks;
   first boundary candidate operation means for calculating a first feeding section boundary candidate of said first power supply means between said first and second power supply means on the basis of position information of a train being present in the feeding section of said first power supply means;
   second boundary candidate operation means for calculating a second feeding section boundary candidate of said second power supply means between said first and second power supply means on the basis of position and speed information of a train being present in the feeding section of said second power supply means;
   section boundary determining means for determining a final boundary located behind the rear side boundary candidate of the front power supply means and before the front side boundary candidate of said rear power supply means; and
   feeding block switch control means for controlling on-off states of said block switches so as to define the feeding section boundary between neighboring two feeding blocks on the basis of the final boundary determined by said section boundary determining means.

* * * * *